(12) United States Patent
Soheilian et al.

(10) Patent No.: US 11,479,656 B2
(45) Date of Patent: *Oct. 25, 2022

(54) SYSTEMS AND METHODS FOR FORMING SHORT-FIBER FILMS, COMPOSITES COMPRISING THERMOSETS, AND OTHER COMPOSITES

(71) Applicant: Boston Materials, Inc., Billerica, MA (US)

(72) Inventors: Rasam Soheilian, Brookline, MA (US); Anvesh Gurijala, Lancaster, MA (US)

(73) Assignee: Boston Materials, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,349

(22) Filed: Jul. 9, 2020

(65) Prior Publication Data

US 2021/0009789 A1     Jan. 14, 2021

Related U.S. Application Data

(60) Provisional application No. 62/938,265, filed on Nov. 20, 2019, provisional application No. 62/872,686, filed on Jul. 10, 2019.

(51) Int. Cl.
*C08K 9/10* (2006.01)
*B32B 5/26* (2006.01)
(Continued)

(52) U.S. Cl.
CPC .............. *C08K 9/10* (2013.01); *B29C 70/025* (2013.01); *B32B 5/12* (2013.01); *B32B 5/26* (2013.01);
(Continued)

(58) Field of Classification Search
CPC ......... C08J 5/06; C08J 5/10; C08J 5/24; C08J 2363/00; C08J 2379/08; C08J 2381/06;
(Continued)

(56) References Cited

U.S. PATENT DOCUMENTS

| 4,025,911 A | 5/1977 | Bobeck et al. |
| 4,481,249 A * | 11/1984 | Ebneth ................. D04H 1/4242 428/300.1 |

(Continued)

FOREIGN PATENT DOCUMENTS

| CN | 1784516 A | 6/2006 |
| CN | 1906234 A | 1/2007 |

(Continued)

OTHER PUBLICATIONS

PCT/US2020/041306, Oct. 29, 2020, Invitation to Pay Additional Fees.

(Continued)

*Primary Examiner* — Camie S Thompson
(74) *Attorney, Agent, or Firm* — Wolf, Greenfield & Sacks, P.C.

(57) ABSTRACT

The present disclosure generally relates to systems and methods for composites, including short-fiber films and other composites. In certain aspects, composites comprising a plurality of aligned fibers are provided. The fibers may be substantially aligned, and may be present at relatively high densities within the composite. For example, the composite may include substantially aligned carbon fibers embedded within a thermoplastic substrate. The composites may be prepared, in some aspects, by dispersing fibers by neutralizing the electrostatic interactions between the fibers, for example using aqueous liquids containing the fibers that are able to neutralize the electrostatic interactions that typically occur between the fibers. The liquids may be applied to a (Continued)

substrate, and the fibers may be aligned using techniques such as shear flow and/or magnetism. Other aspects are generally directed to methods of using such composites, kits including such composites, or the like.

85 Claims, 2 Drawing Sheets

(51) Int. Cl.
    *C08K 7/06*     (2006.01)
    *B32B 5/12*     (2006.01)
    *B32B 7/12*     (2006.01)
    *B32B 15/04*     (2006.01)
    *B32B 15/14*     (2006.01)
    *B32B 15/18*     (2006.01)
    *C22C 38/00*     (2006.01)
    *B29C 70/02*     (2006.01)
    *B29C 70/42*     (2006.01)
    *B29C 70/44*     (2006.01)

(52) U.S. Cl.
    CPC ............... *B32B 7/12* (2013.01); *B32B 15/04* (2013.01); *B32B 15/14* (2013.01); *B32B 15/18* (2013.01); *C08K 7/06* (2013.01); *C22C 38/00* (2013.01); *B29C 70/42* (2013.01); *B29C 70/443* (2013.01); *B32B 2250/03* (2013.01); *B32B 2250/04* (2013.01); *B32B 2250/20* (2013.01); *B32B 2250/40* (2013.01); *B32B 2260/021* (2013.01); *B32B 2260/046* (2013.01); *B32B 2262/106* (2013.01); *B32B 2311/24* (2013.01); *B32B 2311/30* (2013.01)

(58) Field of Classification Search
    CPC .............. C08J 2479/08; C08J 2481/06; B29K 2995/0008; B29C 70/025; B29C 70/081; B29C 70/14; B29C 70/16; B29C 70/887; D10B 2505/02; D04H 1/74; B32B 2250/20; B32B 5/26
    USPC ........... 442/367, 368, 261; 428/221; 164/97; 257/E23.112; 156/296; 264/108, 122
    See application file for complete search history.

(56) References Cited

U.S. PATENT DOCUMENTS

| | | | |
|---|---|---|---|
| 4,523,628 A | 6/1985 | Vives | |
| 5,432,000 A | 7/1995 | Young et al. | |
| 5,876,540 A | 3/1999 | Pannell | |
| 5,968,639 A | 10/1999 | Childress | |
| 7,073,538 B2 | 7/2006 | Bhatnagar et al. | |
| 7,409,757 B2 | 8/2008 | Hall et al. | |
| 7,439,475 B2 | 10/2008 | Ohta | |
| 7,537,825 B1 | 5/2009 | Wardle et al. | |
| 7,655,581 B2 | 2/2010 | Goering | |
| 7,803,262 B2 | 9/2010 | Haik et al. | |
| 7,832,983 B2 | 11/2010 | Kruckenberg et al. | |
| 7,951,464 B2 | 5/2011 | Roberts | |
| 8,173,857 B1 | 5/2012 | Yananton | |
| 8,197,888 B2 | 6/2012 | Sue et al. | |
| 8,575,045 B1 | 11/2013 | McKnight et al. | |
| 8,790,565 B2 | 7/2014 | Miller | |
| 8,889,761 B2 | 11/2014 | Studart et al. | |
| 9,312,046 B2 | 4/2016 | Hong et al. | |
| 9,388,577 B2 | 7/2016 | Kromer et al. | |
| 9,394,196 B2 | 7/2016 | Peters et al. | |
| 9,732,463 B2 | 8/2017 | Carter et al. | |
| 9,892,835 B2 | 2/2018 | Hong et al. | |
| 9,896,783 B2 | 2/2018 | Kia | |
| 2005/0058805 A1 | 3/2005 | Kimura et al. | |
| 2005/0175813 A1 | 8/2005 | Wingert et al. | |
| 2005/0239948 A1 | 10/2005 | Haik et al. | |
| 2006/0286361 A1* | 12/2006 | Yonetake | D01F 9/127 428/293.1 |
| 2008/0145647 A1 | 6/2008 | Ganguli et al. | |
| 2009/0117269 A1 | 5/2009 | Hansen et al. | |
| 2009/0227162 A1 | 9/2009 | Kruckenberg et al. | |
| 2010/0040902 A1 | 2/2010 | Mizrahi | |
| 2010/0196688 A1 | 8/2010 | Kritzer et al. | |
| 2012/0107599 A1 | 5/2012 | Yonetake et al. | |
| 2012/0289107 A1 | 11/2012 | Beissinger et al. | |
| 2013/0053471 A1 | 2/2013 | Studart et al. | |
| 2013/0252497 A1 | 9/2013 | Schiebel et al. | |
| 2014/0250665 A1 | 9/2014 | Choi et al. | |
| 2014/0342630 A1 | 11/2014 | Amtmann et al. | |
| 2015/0228388 A1 | 8/2015 | Hong et al. | |
| 2016/0055930 A1 | 2/2016 | Humfeld | |
| 2016/0083535 A1 | 3/2016 | Wilenski et al. | |
| 2016/0169009 A1 | 6/2016 | Okamoto et al. | |
| 2017/0067186 A1 | 3/2017 | Kia | |
| 2017/0101730 A1 | 4/2017 | Gilbertson | |
| 2017/0173895 A1 | 6/2017 | Williams | |
| 2017/0182700 A1* | 6/2017 | Brady | B29B 7/90 |
| 2017/0338497 A1 | 11/2017 | Tatsuno et al. | |
| 2018/0016420 A1* | 1/2018 | Fujimaki | C08K 7/06 |
| 2018/0016740 A1 | 1/2018 | Kia et al. | |
| 2019/0048500 A1 | 2/2019 | Tierney et al. | |
| 2020/0024795 A1* | 1/2020 | Gurijala | B29C 70/14 |
| 2021/0008840 A1* | 1/2021 | Gurijala | B32B 21/04 |
| 2022/0001631 A1 | 1/2022 | Mone et al. | |

FOREIGN PATENT DOCUMENTS

| | | |
|---|---|---|
| CN | 101224601 A | 7/2008 |
| CN | 105073848 A | 11/2015 |
| CN | 105390210 A | 3/2016 |
| CN | 105690802 A | 6/2016 |
| CN | 105734535 A | 7/2016 |
| EP | 2013408 A2 | 1/2009 |
| EP | 2085215 A1 | 8/2009 |
| EP | 3184288 A1 | 6/2017 |
| JP | 07-197311 A | 8/1995 |
| JP | 07-331358 A | 12/1995 |
| JP | 2015-063664 A | 4/2015 |
| JP | 2016-044302 A | 4/2016 |
| JP | 2016-064648 A | 4/2016 |
| WO | WO 2001/025514 A1 | 4/2001 |
| WO | WO 2005/085334 A2 | 9/2005 |
| WO | WO 2007/130979 A2 | 11/2007 |
| WO | WO 2009/009207 A2 | 1/2009 |
| WO | WO 2011/100734 A1 | 8/2011 |
| WO | WO 2018/175134 A1 | 9/2018 |
| WO | WO 2020/123334 A1 | 9/2018 |

OTHER PUBLICATIONS

PCT/US2018/021975, May 24, 2018, International Search Report and Written Opinion.
PCT/US2018/021975, Oct. 3, 2019, International Preliminary Report on Patentability.
PCT/US2020/041306, Dec. 21, 2020, International Search Report and Written Opinion.
Invitation to Pay Additional Fees for Application No. PCT/US2020/041306 dated Oct. 29, 2020.
[No Author Listed], HexTow® IM7 Carbon Fiber. HEXCEL® Product Data Sheet. Jan. 1, 2020. Retrieved from the Internet. 2 pages.
Kimura et al., Uniaxial alignment of the smallest diamagnetic susceptibility axis using time-dependent magnetic fields. Langmuir. Jul. 6, 2004;20(14):5669-72. doi: 10.1021/la049347w.
Sherman et al., Fiber sizings: coupling agent companions. Composites World. Aug. 1, 2013. Retrieved from the Internet. 1 page.
International Search Report and Written Opinion for Application No. PCT/US2020/041306 dated Dec. 21, 2020.
International Search Report and Written Opinion for Application No. PCT/US2018/021975 dated May 24, 2018.
International Preliminary Report on Patentability for Application No. PCT/US2018/021975 dated Oct. 3, 2019.

(56) References Cited

OTHER PUBLICATIONS

[No Author Listed], Permanent Magnets vs Electromagnets. Adams Magnetic Products. Accessed Sep. 20, 2017. 5 pages.
Boden et al., Nanoplatelet size to control the alignment and thermal conductivity in copper-graphite composites. Nano Lett. Jun. 11, 2014;14(6):3640-4. doi: 10.1021/nl501411g. Epub May 22, 2014.
Erb et al., Composites reinforced in three dimensions by using low magnetic fields. Science. Jan. 13, 2012;335(6065):199-204. doi: 10.1126/science.1210822.
Erb et al., Concentration gradients in mixed magnetic and nonmagnetic colloidal suspensions. J Appl Phys. Mar. 7, 2008;103(07A312):1-3.
Erb et al., Magnetic assembly of colloidal superstructures with multipole symmetry. Nature. Feb. 19, 2009;457(7232):999-1002. doi: 10.1038/nature07766.
Erb et al., Non-linear alignment dynamics in suspensions of platelets under rotating magnetic fields. Soft Matter. 2012;8:7604-9.
Jackson et al., Out-of-plane properties. NASA, Langley Research Center Mechanics of Textile Composites Conference. Oct. 1, 1995:315-348.
Le Ferrand et al., Magnetically assisted slip casting of bioinspired heterogeneous composites. Nat Mater. Nov. 2015;14(11):1172-9. doi: 10.1038/nmat4419. Epub Sep. 21, 2015.
Libanori et al., Mechanics of platelet-reinforced composites assembled using mechanical and magnetic stimuli. ACS Appl Mater Interfaces. Nov. 13, 2013;5(21):10794-805. doi: 10.1021/am402975a. Epub Oct. 25, 2013.
Libanori et al., Ultrahigh magnetically responsive microplatelets with tunable fluorescence emission. Langmuir. Nov. 26, 2013;29(47):14674-80. doi: 10.1021/la4027305. Epub Nov. 15, 2013.
Martin et al., Designing bioinspired composite reinforcement architectures via 3D magnetic printing. Nat Commun. Oct. 23, 2015;6:8641. doi: 10.1038/ncomms9641.
Martin et al., Understanding and overcoming shear alignment of fibers during extrusion. Soft Matter. Jan. 14, 2015;11(2):400-5. doi: 10.1039/c4sm02108h.
Matthews et al., Magnetic alignment of mesophase pitch-based carbon fibers. Appl Phys Lett. Jul. 15, 1996;69(3):430-2.
Ooi et al., On the controllability of nanorod alignment in magnetic fluids. Journal of Applied Physics. Feb. 7, 2008;103(07E910):1-3.
Sander et al., High-performance battery electrodes via magnetic templating. Nature Energy. Aug. 2016;1:1-7.
Sommer et al., Injectable materials with magnetically controlled anisotropic porosity. ACS Appl Mater Interfaces. Oct. 24, 2012;4(10):5086-91. doi: 10.1021/am301500z. Epub Oct. 9, 2012.
Chinese Office Action for Application No. 20188003308.2 dated Jun. 29, 2021.
Extended European Search Report for Application No. 18770244.4 dated Dec. 3, 2020.
International Search Report and Written Opinion for Application No. PCT/US2019/065142 dated Mar. 10, 2020.
International Preliminary Report on Patentability for Application No. PCT/US2019/065142 dated Jun. 24, 2021.
International Search Report and Written Opinion for Application No. PCT/US2020/041322 dated Oct. 9, 2020.
Huang, Fabrication and properties of carbon fibers. Materials. Dec. 16, 2009; 2: 2369-403. doi:10.3390/ma2042369.
Chinese Office Action for Application No. 20188003308.2 dated Jan. 24, 2022.
Japanese Office Action for Application No. 2020-500780 dated Feb. 15, 2022.
Chinese Office Action for Application No. 2019800800347 dated Feb. 16, 2022.
International Preliminary Report on Patentability for Application No. PCT/US2020/041306 dated Jan. 20, 2022.
International Preliminary Report on Patentability for Application No. PCT/US2020/041322 dated Jan. 20, 2022.
Matsuo, Electric, Dielectric and Magnetic Properties of Polymer and Carbon Fillers. International Workshop on Advanced Polymer Science and Turbulent Drag Reduction. Mar. 10-20, 2008. 57 pages.
U.S. Appl. No. 16/495,890, filed Sep. 20, 2019, Gurijala et al..
U.S. Appl. No. 17/293,597, filed May 13, 2021, Mone et al..
U.S. Appl. No. 17/744,553, filed May 13, 2022, Soheilian et al..
U.S. Appl. No. 16/924,381, filed Jul. 9, 2020, Gurijala et al..
CN 2018800333082, dated Jan. 24, 2022, Chinese Office Action.
JP 2020-500780, dated Feb. 15, 2022, Japanese Office Action.
CN 201900800347, dated Feb. 16, 2022, Chinese Office Action.
PCT/US2020/041306, dated Jan. 20, 2022, International Preliminary Report on Patentability.
PCT/US2020/041322, dated Jan. 20, 2022, International Preliminary Report on Patentability.
Japanese Office Action for Application No. 2020-500780 dated Jun. 28, 2022.

\* cited by examiner

SYSTEMS AND METHODS FOR FORMING SHORT-FIBER FILMS, COMPOSITES COMPRISING THERMOSETS, AND OTHER COMPOSITES

RELATED APPLICATIONS

This application claims the benefit of U.S. Provisional Patent Application Ser. No. 62/872,686, filed Jul. 10, 2019, entitled "Systems and Methods for Short-Fiber Films and Other Composites," and of U.S. Provisional Patent Application Ser. No. 62/938,265, filed Nov. 20, 2019, entitled "Methods and Systems for Forming Composites Comprising Thermosets." Each of these is incorporated herein by reference in its entirety.

FIELD

The present disclosure generally relates to systems and methods for composites, including short-fiber films, composites comprising thermosets, and other composites. The present disclosure also generally relates to methods and systems for forming such composites.

BACKGROUND

Conventional carbon fiber composites feature planar assemblies of long carbon fibers. In some composites, the long carbon fibers are woven into multi-axial fabrics or uni-directional tapes. The long carbon fiber assemblies are then immersed with a polymer resin to form a composite layer that can be laminated with other composite layers to form a component. Since carbon fiber is a brittle material, strong curvatures or sharp angles in components can cause the long carbon fibers to break. Broken fibers introduce defects and compromises mechanical properties. Requiring the continuity of long carbon fibers to avoid the loss of performance is a limitation of conventional carbon fiber composites.

This issue can be mitigated by making composite layers with short (<5 mm) carbon fibers instead of long carbon fibers. Short carbon fibers can easily slide to drape and form around strong curvatures or sharp angles, unlike long carbon fibers. Randomly oriented short carbon fibers can be used for components that have lower performance requirements. For components with high mechanical property requirements, the short carbon fibers need to be highly oriented to approach the performance of a long carbon fiber composite. Highly oriented short carbon fibers can also be used to drastically enhance the Z-axis mechanical properties of carbon fiber composites when they are oriented in the Z-axis. In all cases, high fiber volumes (>45%) with uniform dispersion of the short carbon fibers is required in the composite. However, there are no commercially available methods to produce short carbon fiber composites with high fiber volume content while maintaining dispersion or alignment of the short fibers. Thus, improvements are needed.

SUMMARY

The present disclosure generally relates to systems and methods for composites, including short-fiber films and other composites. The subject matter of the present disclosure involves, in some cases, interrelated products, alternative solutions to a particular problem, and/or a plurality of different uses of one or more systems and/or articles.

In one aspect, the present disclosure is generally directed to an article. In some embodiments, the article comprises a composite comprising a substrate and a plurality of discontinuous fibers contained within at least a portion of the substrate. In some cases, the plurality of discontinuous fibers is substantially aligned at a fiber volume fraction of at least 30 vol % within the entire composite.

The present disclosure, in another aspect, is generally directed to a method. According to one set of embodiments, the method comprises applying a liquid on a substrate, where the liquid comprises a plurality of discontinuous fibers, to cause alignment, via shear flow, of at least some of the plurality of discontinuous fibers, applying a magnetic field to the liquid to cause alignment of at least some of the plurality of discontinuous fibers, and removing the liquid to form a fiber-containing substrate.

In another set of embodiments, the method comprises applying a liquid on a substrate, wherein the liquid comprises a plurality of discontinuous fibers; applying a magnetic field to the liquid to cause alignment of at least some of the plurality of discontinuous fibers and/or applying a shearing fluid to the substrate to cause alignment, via shear flow, of at least some of the plurality of discontinuous fibers; and removing the liquid to form a fiber-containing substrate.

In another aspect, the present disclosure encompasses methods of making one or more of the embodiments described herein, for example, short-fiber films and other composites. In still another aspect, the present disclosure encompasses methods of using one or more of the embodiments described herein, for example, short-fiber films and other composites.

The present disclosure also generally relates to composites in some embodiments, including composites comprising thermosets, and methods and systems for forming such composites.

For example, one aspect is generally directed to a composite comprising a thermoset polymer and a plurality of discontinuous fibers contained within at least a portion of the composite. In some embodiments, the plurality of discontinuous fibers is substantially aligned at a fiber volume fraction of at least 20 vol % within the entire composite.

Another aspect is generally directed to a method. In one set of embodiments, the method comprises coating at least a portion of a substrate comprising discontinuous fibers with a thermoset polymer precursor, curing the thermoset polymer precursor to form a thermoset polymer, and removing at least some of the thermoset polymer from the substrate as a polymeric layer. In some embodiments, the discontinuous fibers are substantially aligned and are present at a volume fraction of at least 20 vol % of the substrate.

The method, in another set of embodiments, is generally directed to coating at least a portion of a substrate with a slurry comprising water and discontinuous fibers, aligning at least some of the discontinuous fibers, removing water from the slurry to produce the substrate comprising the substantially aligned discontinuous fibers; coating at least a portion of the substrate with a thermoset polymer precursor; curing the thermoset polymer precursor to form a thermoset polymer; and removing at least some of the thermoset polymer from the substrate as a polymeric layer.

According to yet another set of embodiments, the method comprises coating at least a portion of a substrate with a slurry comprising water and discontinuous fibers, aligning at least some of the discontinuous fibers, coating at least a portion of the substrate with a thermoset polymer precursor, curing the thermoset polymer precursor to form a thermoset polymer, and removing at least some of the thermoset polymer from the substrate as a polymeric layer.

In another aspect, the present disclosure encompasses methods of making one or more of the embodiments described herein. In still another aspect, the present disclosure encompasses methods of using one or more of the embodiments described herein.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1:
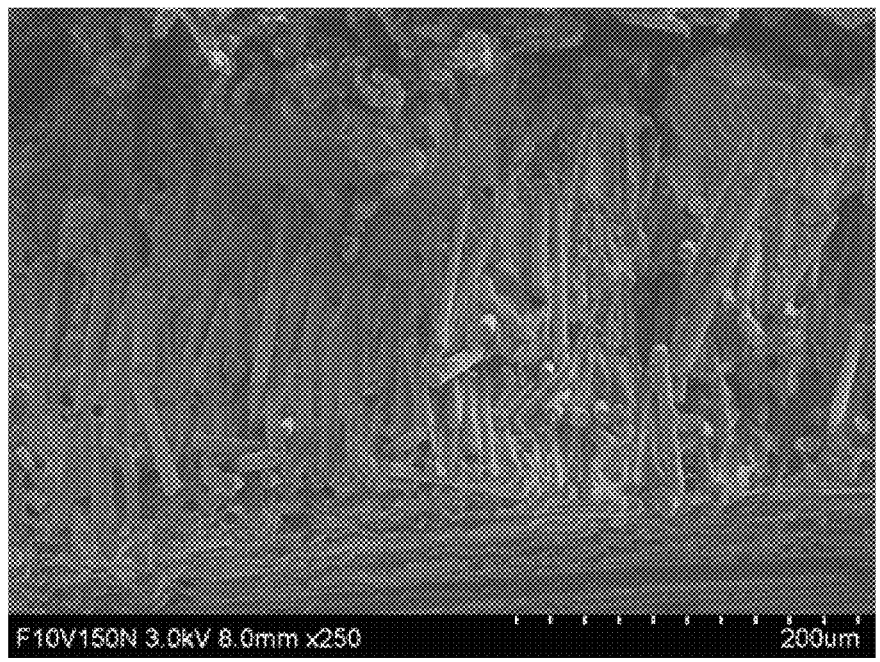
FIG. 1 illustrates a substrate with aligned carbon fibers, in accordance with one embodiment of the disclosure.

The present disclosure generally relates to systems and methods for composites, including short-fiber films and other composites. In certain aspects, composites comprising a plurality of aligned fibers are provided. The fibers may be substantially aligned, and may be present at relatively high densities within the composite. For example, the composite may include substantially aligned carbon fibers embedded within a thermoplastic substrate. The composites may be prepared, in some aspects, by dispersing fibers by neutralizing the electrostatic interactions between the fibers, for example using aqueous liquids containing the fibers that are able to neutralize the electrostatic interactions that typically occur between the fibers. The liquids may be applied to a substrate, and the fibers may be aligned using techniques such as shear flow and/or magnetism. Other aspects are generally directed to methods of using such composites, kits including such composites, or the like.

The present disclosure also generally relates to composites, including composites comprising thermosets, and methods and systems for forming such composites. Certain aspects, for example, are directed to methods of transferring aligned fibers (e.g., carbon fibers) using a polymer such as a thermoset polymer (e.g., an epoxy). In some cases, the polymer may be coated onto a substrate comprising fibers, and pressed and/or heated to melt or cure at least some of the polymer. The polymer can then be removed from the substrate for example, to produce a thermoset material comprising the aligned fibers. The fibers may be aligned using techniques such as shear flow and/or magnetism. Other aspects are generally directed to methods of using such composites, kits including such composites, or the like.

Accordingly, certain aspects are generally directed to composites for use in various applications. For example, for components with high mechanical property requirements, certain embodiments are generally directed to composites comprising short fibers (e.g., less than 5 mm in length), which may comprise carbon or other types of fibers. The fibers may be highly oriented or aligned within the composite, which may allow it to approach the performance of a long carbon fiber composite. Highly oriented fibers can also be used to drastically enhance the Z-axis mechanical properties of the composites when they are oriented relative to the Z-axis. In some cases, high fiber volumes (>45%) with uniform dispersion of the fibers may be used within the composite.

Certain embodiments are accordingly directed to systems and methods to produce fiber composites with high fiber volume content while maintaining dispersion or alignment of the fibers. For example, the fibers may be relatively short, and may comprise carbon or other materials. In some cases, the fibers may be homogeneously dispersed in a polymer resin or other slurry. Short fibers may have high electrostatic interactions that promotes agglomeration, and the high viscosity of polymer resins can prevent consistent dispersion at higher fiber volumes. These processing defects thus can cause inconsistent fiber reinforcement and gradients in resin content in the composite, which can drastically reduce the performance of the composite. Accordingly, certain embodiments as discussed herein can overcome these limitations. In addition, some embodiments are generally directed to aligned fibers that maintain high fiber volume content. Apart from issues with dispersing the short fibers, prior art methods struggle with issues such as low fiber volume fractions, insufficient alignment, or long overall fiber lengths that risk issues with fiber breaking.

Thus certain embodiments as discussed herein are directed to systems and methods for dispersing fibers by neutralizing the electrostatic interactions between the fibers, for example using aqueous slurries. In some cases, the slurries containing well-dispersed fibers can be metered onto substrates such as thermoplastic films. During metering, the alignment of the fibers can be controlled, for example, by using shear flow and/or magnetic alignment. This may be implemented, for example, in a roll-to-roll manufacturing process.

For instance, in one set of embodiments, an aqueous liquid comprising suitable fibers may be applied to a substrate, e.g., as a coating. The liquid may be selected to neutralize electrostatic interactions that typically occur between the fibers, as noted above. The substrate can be, for example, a thermoplastic film, or other materials such as discussed herein. The fibers may include carbon fibers and/or other fibers. The fibers are then aligned, for example, by applying a magnetic field and/or a shear force, e.g., by applying a suitable fluid to the liquid applied to the substrate. After alignment, the final composite may be formed, for example, by applying heat (e.g., to remove the liquid, for example, via evaporation), and/or pressure (e.g., to embed the fibers into the substrate).

The above discussion is a non-limiting example of one embodiment that can be used to produce certain types of short-fiber composite. However, other embodiments are also possible. Accordingly, more generally, various aspects are directed to various systems and methods for producing short-fiber films and other composites and materials.

For example, certain aspects are generally directed to short-fiber films and other composites. In some cases, such composites may comprise a substrate and a plurality of discontinuous or short fibers contained or embedded within the substrate, or at least a portion thereof. In some cases, the plurality of fibers are substantially aligned or oriented within the substrate.

A variety of materials may be used for the substrate. For instance, in one set of embodiments, the substrate comprises a polymer, such as a thermoplastic or a thermoset. In some cases, the substrate consists essentially of a polymer. In some embodiments, at least 30%, at least 40%, at least 50%, at least 50%, at least 70%, at least 80%, at least 90%, at least 95%, at least 97%, or at least 99% by volume of the substrate (without the discontinuous fibers) may be a polymer.

The substrate may include one or more polymers, including the following polymers, and may also include other polymers, in addition to or instead of these polymers. Examples of suitable polymers for the substrate include, but are not limited to, polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

The present disclosure also generally relates to composites, including composites comprising thermosets, and methods and systems for forming such composites. Certain aspects, for example, are directed to methods of transferring aligned fibers (e.g., carbon fibers) using a polymer such as a thermoset polymer (e.g., an epoxy). In some cases, the polymer may be coated onto a substrate comprising fibers, and pressed and/or heated to melt or cure at least some of the polymer. The polymer can then be removed from the substrate for example, to produce a thermoset material comprising the aligned fibers. The fibers may be aligned using techniques such as shear flow and/or magnetism. Other aspects are generally directed to methods of using such composites, kits including such composites, or the like.

Some aspects are generally directed to techniques for producing fiber composites (for example, comprising carbon or other fibers) with high fiber volume content while maintaining dispersion or alignment of the fibers. Certain embodiments are generally directed to dispersing the fibers in a polymer resin, e.g., substantially homogeneously. Some fibers have relatively high electrostatic interactions that can promote agglomeration. In addition, in some cases, some polymer resins have relatively high viscosities that may prevent consistent dispersion at higher fiber volumes. These processing defects can cause inconsistent fiber reinforcement and gradients in resin content in the composite, which can drastically reduce the performance of the composite. In addition, some embodiments are generally directed to aligning fibers while maintaining high fiber volume content.

For example, in some embodiments, carbon and/or other fibers are dispersed by neutralizing the electrostatic interactions between the fibers in an aqueous slurry. A slurry with the dispersed fibers is metered onto a substrate, e.g., as a coating. The alignment of the fibers can be controlled, for example, by using shear and/or magnetic alignment, etc. After alignment, the fibers are infused with a thermoset resin, such as an epoxy. In some cases, this process can be implemented into a roll-to-roll manufacturing process that allows the production of fiber composites with relatively high fiber volumes and relatively well-controlled dispersion and alignment of the fibers.

In some embodiments, a substrate may be coated with a slurry or other liquid comprising discontinuous fibers. For example, the substrate may be a polymer, such as polyetherimide. The slurry may be based on water or other liquids. The discontinuous fibers may include carbon fibers, and/or other natural or synthetic fibers such as those described herein. The fibers may then be aligned using a variety of techniques, such as exposure to magnetic fields, liquids (e.g., for shear alignment), or the like. In some cases, the fibers may be exposed to magnetic particles to facilitate magnetic alignment, although in other cases, no magnetic particles may be used, even for magnetic alignment applications.

After alignment, some or all of the water (and/or other liquid) may be removed from the slurry, e.g., to produce a material comprising the aligned fibers. It will be understood that practically, the alignment of the fibers need not be perfect, i.e., not all of the fibers may be perfectly parallel to each other. A variety of techniques may be used to remove at least some of the water and/or other liquid, such as heating or evaporation, physical drainage, etc.

The fibers may be then be coated or otherwise exposed to a thermoset polymer. The thermoset polymer may include an epoxy, and/or other polymers such as those described herein. In some cases, a film or layer of thermoset polymer may be contacted with the fibers, and in some cases, heat and/or pressure added to improve contact. For example, in some embodiments, heat and/or pressure may be added to cause at least some of the thermoset polymer to melt, e.g., to flow between the fibers. The thermoset polymer may then cure or harden in place, e.g., via cooling.

The hardened thermoset polymer may then be removed from the substrate, e.g., to produce a thermoset polymer comprising at least some of the fibers. In some cases, the thermoset polymer may partially or completely embed some or all of the fibers. A variety of techniques may be used to remove the polymer from the substrate. For instance, in one embodiment, some or all of the thermoset polymer may be peeled off of the substrate, e.g., as a single polymeric layer.

The above discussion is a non-limiting example of one embodiment of the present disclosure that can be used to produce certain types of short-fiber composites. However, other embodiments are also possible. Accordingly, more generally, various aspects are directed to various systems and methods for producing short-fiber films and other composites and materials.

One aspect is generally directed to composites comprising a polymeric material and a plurality of discontinuous fibers. The polymeric material may comprise a thermoset polymer. In certain cases, some or all of the discontinuous fibers are partially or fully embedded within the thermoset polymer, or at least a portion thereof. In some cases, the plurality of fibers are substantially aligned or oriented within the material.

In one set of embodiments, the polymeric material comprises a thermoset polymer. In some cases, the material consists essentially of a polymer. In certain embodiments, at least 30%, at least 40%, at least 50%, at least 50%, at least 70%, at least 80%, at least 90%, at least 95%, at least 97%, or at least 99% by volume of the material (without the discontinuous fibers) may be a polymer, such as a thermoset polymer.

In some embodiments, the thermoset polymer may be cured by heat and/or pressure, substantially irreversibly, from a soft solid or viscous liquid prepolymer or resin into a hardened polymer. In some cases, catalysts may be used to promote polymerization or cross-linking.

One example of a thermoset polymer is an epoxy. In some cases the epoxy resins may be reacted (e.g., cross-linked) with themselves through catalytic homopolymerisation, and/or with a wide range of co-reactants including polyfunctional amines, acids (and acid anhydrides), phenols, alcohols and thiols (usually called mercaptans). These co-reactants are often referred to as hardeners or curatives, and the cross-linking reaction is commonly referred to as curing.

Other examples of thermoset polymers include, but are not limited to, polyesters, polyurethanes, bakelite, duroplast, urea-formaldehyde, melamine, diallyl-phthalates, benzoxazines, polyimides, bismaleimides, cyanate esters, polycyanurates, furan resins, silicone resins, thiolytes, vinyl esters, and the like. Additional non-limiting examples include polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, polyvinylidene fluoride, phenolics, bismaleimides, cyanate esters, polyimides, a silicone rubber, styrene butadiene rubber, or a preceramic monomer, such as a siloxane, a silazane, or a carbosilane. Many such thermoset polymers and precursors thereof can be obtained commercially.

In some instances, the thermoset polymer may comprise a relatively large portion of the polymeric material. For example, in certain embodiments, the thermoset polymer may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass of the material. In some cases, the thermoset polymer comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass of the material. Combinations of any of these are also possible.

The material may also include additional polymers in certain embodiments, including the following polymers, and may also include other polymers, in addition to or instead of these polymers. Examples of suitable polymers for the material include, but are not limited to, polyimide (PI), polyamide-imide (PAI), polyetheretherketone (PEEK), polyetherketone (PEK), polyphenylsulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

Certain embodiments are generally directed to composites comprising substrates formed from continuous fibers, and containing a plurality of discontinuous fibers. The continuous fibers generally have a length that on average is substantially longer than the cross-sectional dimension of the discontinuous fibers. For instance, the continuous fibers may have an average length that is greater than 10, greater than 30, greater than 50, greater than 100, greater than 300, greater than 500, or greater than 1,000 times the cross-sectional dimension of the discontinuous fibers. In some embodiments, the continuous fibers have an average aspect ratio (e.g., of length to diameter or average cross-sectional dimension) of at least 3, at least 5, at least 10, at least 30, at least 50, at least 100, at least 300, at least 500, at least 1,000, etc. Additionally, in certain cases, the continuous fibers may have an average length of at least 5 mm, at least 1 cm, at least 3 cm, at least 5 cm, or at least 10 cm. Longer average lengths are also possible in some instances.

The continuous fibers may be woven together (e.g. bidirectional, multidirectional, quasi-isotropic, etc.), and/or non-woven (e.g., unidirectional, veil, mat, etc.). In certain embodiments, at least some of the continuous fibers are substantially parallel, and/or orthogonally oriented relative to each other, although other configurations of continuous fibers are also possible. In certain embodiments, the continuous fibers may together define a fabric or other substrate, e.g., a textile, a tow, a filament, a yarn, a strand, or the like. In some cases, the substrate may have one orthogonal dimension that is substantially less than the other orthogonal dimensions (i.e., the substrate may have a thickness).

The continuous fibers forming the substrate may comprise any of a wide variety of materials, and one type or more than one type of fiber may be present within the substrate. Non-limiting examples include carbon, basalt, silicon carbide, aramid, zirconia, nylon, boron, alumina, silica, borosilicate, mullite, cotton, or any other natural or synthetic fibers.

The continuous fibers may have any suitable average diameter. For example, the continuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the continuous fibers may have an average diameter of between 10 micrometers and 100 micrometers, between 50 micrometers and 500 micrometers, between 100 micrometers and 5 mm, etc.

The continuous fibers may also have any suitable average length. For example, the continuous fibers may have an average length of at least about 0.5 cm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 0.5 cm, or the like. Combinations of any of these are also possible; for example, the continuous fibers may have an average length of between 1 cm and 10 cm, between 10 cm and 100 cm, etc.

In some instances, the continuous fibers may comprise a relatively large portion of the composite. For example, in certain embodiments, the continuous fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass or volume of the composite. In some cases, the continuous fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass or volume of the composite. Combinations of any of these are also possible.

The composite may also contain one or more discontinuous fibers in one set of embodiments. These may be present anywhere in the composite, for example, contained or embedded within the substrate, or at least a portion thereof, e.g., within a polymer such as a thermoset polymer. In some cases, the discontinuous fibers may be substantially aligned within the composite, e.g., forming a layer within the composite. In some cases, at least 50%, at least 70%, at least 80%, at least 90%, at least 95%, at least 97%, or at least 99% by volume of the substrate may contain discontinuous fibers. As another example, at least 50%, at least 70%, at least 80%, at least 90%, at least 95%, at least 97%, or at least 99% by volume of the polymeric material may contain discontinuous fibers.

The discontinuous fibers may be formed or include any of a wide variety of materials, and one or more than one type of material may be present. For example, the discontinuous fibers may comprise materials such as carbon (e.g., carbon fibers), basalt, silicon carbide, silicon nitride, aramid, zirconia, nylon, boron, alumina, silica, borosilicate, mullite, nitride, boron nitride, graphite, glass, a polymer (including any of those described herein), or the like. The discontinuous fibers may include any natural and/or any synthetic material, and may be magnetic and/or non-magnetic.

The discontinuous fibers, in some embodiments, may be at least substantially aligned within the composite. Methods for aligning discontinuous fibers are discussed in more detail herein. Various alignments are possible, and in some cases, can be determined optically or microscopically, e.g. Thus, in some cases, the alignment may be determined qualitatively. However, it should be understood that the alignment need not be perfect. In some cases, at least 5%, at least 10%, at least 25%, at least 50%, at least 75%, at least 85%, at least 90%, or at least 95% of the fibers within a substrate or composite may exhibit an alignment that is within 20°, within 15°, within 10°, or within 5° of the average alignment of the plurality of the fibers, e.g., within a sample of the substrate or composite. In some cases, the average alignment of the fibers may be oriented to be at least 60°, at least 65°, at least 70°, at least 75°, at least 85°, or at least 87° relative to the plane of the substrate or composite at that location.

Without wishing to be bound by any theory, it is believed that alignment of the discontinuous fibers substantially orthogonal to the substrate may serve to provide reinforcement of the substrate or composite. This may improve the strength of the substrate or composite, e.g., when subjected to forces in different directions. For instance, fibers within the substrate may run in substantially orthogonal directions in 3 dimensions, thereby providing strength to the substrate or composite regardless of the direction of force that is applied. The fibers may also limit degradation of the surface, e.g., with interlaminar micro-cracks, through-ply fissures, or the like. In addition, in some embodiments, the fibers may enhance other properties of the substrate or composite, e.g., electrical and/or thermal properties within the composite, in addition to or instead of its mechanical properties.

While others have suggested packing fibers in a substrate or composite, it is believed that higher fiber volume fractions were previously unachievable, e.g., due to higher electrostatic interactions that cause fiber agglomeration, and/or higher viscosities of polymer resins that can prevent consistent dispersion. Accordingly, certain embodiments are generally directed to fiber volume fractions (e.g., of substantially aligned fibers such as those discussed herein) of at least 40% fiber volume, at least 45% fiber volume, at least 50% fiber volume, at least 55% fiber volume, at least 60% fiber volume, at least 65% fiber volume, at least 70% fiber volume, etc.

A variety of techniques may be used to align the discontinuous fibers in various embodiments, including magnetic fields, shear flow, or the like, as are discussed in more detail below. As a non-limiting example, magnetic particles, including those discussed herein, can be attached to the fibers, and a magnetic field may then be used to manipulate the magnetic particles. For instance, the magnetic field may be used to move the magnetic particles into the substrate or a composite, and/or to align the discontinuous fibers within the substrate or composite. The magnetic field may be constant or time-varying (e.g., oscillating), for instance, as is discussed herein. For example, an applied magnetic field may have a frequency of 1 Hz to 500 Hz and an amplitude of 0.01 T to 10 T. Other examples of magnetic fields are described in more detail below.

In some cases, the discontinuous fibers may have an average length, or characteristic dimension, of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 10 mm, at least 15 mm, etc. In certain embodiments, the discontinuous fibers may have an average length, or characteristic dimension, of no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, no more than 3 micrometers, no more than 1 micrometers, no more than 500 nm, no more than 300 nm, no more than 100 nm, no more than 50 nm, no more than 30 nm, no more than 10 nm, no more than 5 nm, etc. Combinations of any of these are also possible. For example, the discontinuous fibers within a composite may have an average length of between 1 mm and 5 mm.

In addition, the discontinuous fibers may also have any suitable average diameter. For instance, the discontinuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the discontinuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the discontinuous fibers may have an average diameter of between 10 micrometers and 100 micrometers, between 50 micrometers and 500 micrometers, between 100 micrometers and 5 mm, etc.

In certain embodiments, the discontinuous fibers may have a length that is at least 10 times or at least 50 times its thickness or diameter, on average. In some cases, the fibers within a composite may have an average aspect ratio (ratio of fiber length to diameter or thickness) of at least 3, at least 5, at least 10, at least 30, at least 50, at least 100, at least 300, at least 500, at least 1,000, at least 3,000, at least 5,000, at least 10,000, at least 30,000, at least 50,000, or at least 100,000. In some cases, the average aspect ratio may be less than 100,000, less than 50,000, less than 30,000, less than 10,000, less than 5,000, less than 3,000, less than 1,000, less than 500, less than 300, less than 100, less than 50, less than 30, less than 10, less than 5, etc. Combinations of any of these are also possible in some cases; for instance, the aspect ratio may be between 5, and 100,000.

In some instances, the discontinuous fibers may comprise a relatively large portion of the composite. For example, in certain embodiments, the discontinuous fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass of the composite or polymeric material. In some cases, the discontinuous fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass of the composite or polymeric material. Combinations of any of these are also possible.

At least some of the discontinuous fibers may be uncoated. In some cases, however, some or all of the discontinuous fibers may be coated. The coating may be used, for example, to facilitate the adsorption or binding of particles, such as magnetic particles, onto the fibers, or for other reasons.

As one example, at least some of the discontinuous fibers are coated with sizing. Some examples of sizings include, but are not limited to, polypropylene, polyurethane, polyamide, phenoxy, polyimide, epoxy, or the like. These sizings can be introduced into the slurry, for example, as a solution, dispersion, emulsion, etc. As other examples, the fibers may be coated with a surfactant, a silane coupling agent, an epoxy, glycerine, polyurethane, an organometallic coupling agent, or the like. Non-limiting examples of surfactants include oleic acid, sodium dodecyl sulfate, sodium lauryl sulfate, etc. Non-limiting examples of silane coupling agents include amino-, benzylamino-, chloropropyl-, disulfide-, epoxy-, epoxy/melamine-, mercapto-, methacrylate-, tertasulfido-, ureido-, vinyl-, isocynate-, and vinly-benzyl-amino-based silane coupling agents. Non-limiting examples of organometallic coupling agents include aryl- and vinyl-based organometallic coupling agents.

As mentioned, in one set of embodiments, at least some of the discontinuous fibers may be carbon fibers. The carbon fibers may be aligned in a magnetic field directly or indirectly, e.g., using magnetic particles or other techniques such as those discussed herein. For instance, some types of carbon fibers are diamagnetic, and can be directly moved using an applied magnetic field. Thus, certain embodiments are directed to fibers or composites that are substantially free of paramagnetic or ferromagnetic materials could still be aligned using an external magnetic field. For example, if any paramagnetic or ferromagnetic materials are present, they may form less than 5%, less than 1%, less than 0.5%, less than 0.3%, less than 0.1%, less than 0.05%, less than 0.03%, less than 0.01%, less than 0.005%, less than 0.003%, or less than 0.001% (by mass) of the material.

A variety of carbon fibers may be obtained commercially, including diamagnetic carbon fibers. In some cases, carbon fibers can be produced from polymer precursors such as polyacrylonitrile (PAN), rayon, pitch, or the like. In some cases, carbon fibers can be spun into filament yarns, e.g., using chemical or mechanical processes to initially align the polymer atoms in a way to enhance the final physical properties of the completed carbon fibers. Precursor compositions and mechanical processes used during spinning filament yarns may vary. After drawing or spinning, the polymer filament yarns can be heated to drive off non-carbon atoms (carbonization or pyrolization), to produce final carbon fiber. In some embodiments, such techniques may be used to produce carbon fiber with relatively high carbon content, e.g., at least 90%, or other contents as described herein.

Non-limiting examples of carbon fibers include, for instance, pitch- and/or polymer-based (e.g. ex-PAN or ex-Rayon) variants, including those commercially-available. In some cases, these may include intermediate/standard modulus (greater than 200 GPa) carbon fibers, high modulus (greater than 300 GPa), or ultra-high modulus (greater than 500 GPa) carbon fibers.

In one set of embodiments, the carbon fibers have a relatively high carbon content. Without wishing to be bound by any theory, it is believed that such fibers may exhibit diamagnetic properties that allows them to be oriented with low-energy magnetic fields. In general, diamagnetism is the repulsion of a material to an applied magnetic field by generation of an induced magnetic field that is opposite in direction to the applied magnetic field. A material is typically categorized as diamagnetic if it lacks noticeable paramagnetic or ferromagnet contributions to the overall magnetic response. In many cases, the magnetic response of diamagnetic materials is very weak and negligible. However, relatively high magnetic fields can induce a noticeable physical response in such diamagnetic materials.

Thus, in some cases, carbon fibers exhibiting relatively highly-oriented molecular structures may exhibit anisotropic, high-diamagnetism diamagnetic properties. Such diamagnetic properties may allow them to be oriented with relatively weak magnetic fields, such as is described herein. For example, in one set of embodiments, an applied magnetic field may generate a strong induced magnetic field in the C—C bonds of a carbon fiber in the opposite direction of the applied magnetic field. Certain types of carbon fibers may possess a high degree of C—C bonds parallel to the in-fiber direction, which may create an anisotropic diamagnetic response. Thus, such carbon fibers can be subjected to a magnetic torque that is neutralized when the carbon fiber aligns fully-parallel to the applied magnetic field. Accordingly, by applying a suitable magnetic field, the carbon fibers may be aligned due to such diamagnetic properties. This response may be sufficient to overcome gravitational, viscous, and/or interparticle steric effects.

For instance, in certain embodiments, the carbon fibers may have a carbon content of greater than 80%, greater than 90%, greater than 92%, greater than 94%, greater than 95%, greater than 96%, greater than 97%, greater than 98% greater than 99%, or greater than 99.5% by mass. Such carbon fibers may be obtained commercially in some cases. For example, the carbon fibers may be produced pyrolytically e.g., by "burning" or oxidizing other components that can be removed (e.g., by turning into a gas), leaving behind a carbon fiber with a relatively high carbon content. Other methods of making carbon fibers are also possible, e.g., as discussed in detail herein.

The carbon fibers may also exhibit substantial alignment of the C—C bonds within the carbon fibers in some instances. For instance, at least 50%, at least 60%, at least 70%, at least 75%, at least 80%, at least 85%, at least 90%, or at least 95% of the carbon fibers may exhibit substantial alignment of the C—C bonds. Such alignment may be determined, for example, using wide angle x-ray diffraction (WAXD), or other techniques known to those of ordinary skill in the art.

In one set of embodiments, the carbon fibers may have a relatively high modulus (tensile modulus, which is a measure of stiffness). Typically, higher modulus fibers are stiffer and lighter than low modulus fibers. Carbon fibers typically have a higher modulus when force is applied parallel to the fibers, i.e., the carbon fibers are anisotropic. In some embodiments, the carbon fibers may have a modulus (e.g., when force is applied parallel to the fibers) of at least 100 GPa, at least 200 GPa, at least 300 GPa, at least 400 GPa, at least 500 GPa, at least 600 GPa, at least 700 GPa, etc. It is believed that more flexible carbon fibers may exhibit less alignment, i.e., carbon fibers having a low modulus may have subtle physical responses to magnetic fields, or have no response, rather than align within an applied magnetic field.

In one set of embodiments, the carbon fibers may exhibit an anisotropic diamagnetic response when free-floating within a liquid (e.g., water, oil, polymer resin, polymer melt, metal melt, an alcohol such as ethanol, or another volatile organic compound), and a magnetic field is applied. For example, in some cases, the carbon fibers may align when a suitable magnetic field is applied, i.e., indicative of a diamagnetic response. In some cases, the magnetic field may be at least 100 mT, at least 200 mT, at least 300 mT, at least 500 mT, at least 750 mT, at least 1 T, at least 1.5 T, at least 2 T, at least 3 T, at least 4 T, at least 5 T, at least 10 T, etc. In some cases, at least 30%, at least 40%, at least 50%, at least 60%, at least 70%, at least 80%, or at least 90%, of the free-floating carbon fibers within the liquid may exhibit alignment when a suitable magnetic field is applied.

Typically, a carbon fiber has a shape such that one orthogonal dimension (e.g., its length) is substantially greater than its other two orthogonal dimensions (e.g., its width or thickness). The fiber may be substantially cylindrical in some cases. As mentioned, the carbon fibers may be relatively stiff, in some instances; however, a carbon fiber need not be perfectly straight (e.g., its length may still be determined along the fiber itself, even if it is curved).

In one set of embodiments, the carbon fiber may have a dimension (e.g., a characteristic dimension) that is substantially the same, or smaller, than the thickness of the substrate or composite. For example, at least some carbon fibers within a substrate or composite may have an average length that substantially spans the thickness of the substrate or composite. However, in other cases, the characteristic dimension of the carbon fiber may be greater than the thickness.

As mentioned, in one set of embodiments, particles such as magnetic particles may be added, for example, to align the discontinuous fibers, or for other applications. The particles may be adsorbed or otherwise bound to at least some of the discontinuous fibers. In some cases, the particles may coat some or all of the discontinuous fibers and/or the continuous fibers. This may be facilitated by a coating of material as discussed herein, although a coating is not necessarily required to facilitate the adsorption of the particles.

If the particles are magnetic, the particles may comprise any of a wide variety of magnetically susceptible materials. For example, the magnetic materials may comprise one or more ferromagnetic materials, e.g., containing iron, nickel, cobalt, alnico, oxides of iron, nickel, cobalt, rare earth metals, or an alloy including two or more of these and/or other suitable ferromagnetic materials. In some cases, the magnetic particles may have a relative permeability of at least 2, at least 5, at least 10, at least 20, at least 40, at least 100, at least 200, at least 500, at least 1,000, at least 2,000, at least 5,000, or at least 10,000.

However, it should be understood that not all of the particles are necessarily magnetic. In some cases, nonmagnetic particles may be used, e.g., in addition to and/or instead of magnetic particles. Non-limiting examples of nonmagnetic particles include glass, polymer, metal, or the like.

The particles (if present) may be spherical or non-spherical, and may be of any suitable shape or size. The particles may be relatively monodisperse or come in a range of sizes. In some cases, the particles may have a characteristic dimension, on average, of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. The particles within the composite may also have an average characteristic dimension of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the particles may exhibit a characteristic dimension of or between 100 micrometer and 1 mm, between 10 micrometer and 10 micrometer, etc. The characteristic dimension of a non-spherical particle may be taken as the diameter of a perfect sphere having the same volume as the nonspherical particle.

In some embodiments, the particles (including magnetic and/or non-magnetic particles) may comprise a relatively large portion of the composite. For example, in certain embodiments, the particles may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the volume of the composite. In some cases, the particles comprise no more than 97%, no more than 95%, no more than 90%, no more than 85%, no more than 80%, no more than 70%, no more than 60%, no more than 50%, no more than 45%, no more than 40%, no more than 35% no more than 30%, no more than 25%, no more than 20%, no more than 15%, no more than 10%, no more than 7%, no more than 5%, no more than 4%, no more than 3%, no more than 2%, or no more than 1% of the volume of the composite. Combinations of any of these are also possible.

As discussed, one set of embodiments are generally directed to composites, for example, comprising a polymeric material such as discussed herein. In some cases, the composite is generally planar, and/or may contain more than one layer or substrate. However, it should be understood that the substrate, composite, or a layer within the composite, need not be a mathematically-perfect planar structure (although it can be); for instance, a substrate, composite or a layer may also be deformable, curved, bent, folded, rolled, creased, or the like. As examples, the substrate, composite or a layer may have an average thickness of at least about 0.1 micrometers, at least about 0.2 micrometers, at least about 0.3 micrometers, at least about 0.5 micrometers, at least about 1 micrometer, at least about 2 micrometers, at least about 3 micrometers, at least about 5 micrometers, at least about 10 micrometers, at least about 30 micrometers, at least about 50 micrometers, at least about 100 micrometers, at least about 300 micrometers, at least about 500 micrometers, at least about 1 mm, at least about 2 mm, at least about 3 mm, at least about 5 mm, at least about 1 cm, at least about 3 cm, at least about 5 cm, at least about 10 cm, at least about 30 cm, at least about 50 cm, at least about 100 cm, etc. In certain instances, the average thickness may be less than 100 cm, less than 50 cm, less than 30 cm, less than 10 cm, less than 5 cm, less than 3 cm, less than 1 cm, less than 5 mm, less than 2 mm, less than 3 mm, less than 1 mm, less than 500 micrometers, less than 300 micrometers, less than 100 micrometers, less than 50 micrometers, less than 30 micrometers, less than 10 micrometers, less than 5 micrometers, less than 3 micrometers, less than 1 micrometers, less than 0.5 micrometers, less than 0.3 micrometers, or less than 0.1 micrometers. Combinations of any of these are also possible in certain embodiments. For instance, the average thickness may be between 0.1 and 5,000 microns, between 10 and 2,000 microns, between 50 and 1,000 microns, or the like. The thickness may be uniform or non-uniform across the substrate, composite, or layer. Also, the substrate, composite or layer may be rigid (e.g., as discussed herein), or may be deformable in some cases.

In one set of embodiments, a binder is also present within the composite or polymeric material, e.g., which may be used to bind the continuous fibers and the discontinuous fibers, e.g., within the composite. For example, the binder may facilitate holding the discontinuous fibers in position within the composite. However, it should be understood that the binder is optional and not required in all cases. The binder may include, for example, a thermoset, thermoplastic, and/or a vitrimer. In certain embodiments, the binder may comprise a thermoplastic solution, thermoplastic pellets, a thermoset resin, a volatile compound such as a volatile organic compound, water, or an oil. Additional non-limiting examples of binders include polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, styrene butadiene rubber, or a pre-ceramic monomer, such as a siloxane, a silazane, or a carbosilane. In some cases, a binder may comprise a covalent network polymer prepared from an imine-linked oligomer and an independent crosslinker comprising a reactive moiety. Non-limiting examples of reactive moieties include epoxy, isocyanate, bismaleimide, sulfide, polyurethane, anhydride, and/or polyester. Examples of vitrimers include, but are not limited to, epoxy resins based on diglycidyl ether of bisphenol A, aromatic polyesters, polylactic acid (polylactide), polyhydroxyurethanes, epoxidized soybean oil with citric acid, polybutadiene, etc. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

Composites such as those described herein may be used in a wide variety of applications. As non-limiting examples, composites may be used in diverse applications such as reinforcement for pressure vessels, components for wind turbines, shims used in jacking heavy structures, sporting equipment, building or construction materials, laminates or encapsulants for electronic devices, battery components, or panels for vehicles such as automobiles, aircraft, marine vehicles, or spacecraft. In some cases, the composites may be useful for eliminating or reducing stress concentrations or delamination within materials, stiffening materials, eliminating or reducing surface wear, dissipating electrical shocks, transmitting electrical signals, attenuating or transmitting electromagnetic waves, dissipating thermal shocks, eliminating or reducing thermal gradients, as components for energy storage applications, or as components for carbon fibers or ceramic matrixes.

Another aspect is generally directed to systems and methods for making composites such as those described herein. In one set of embodiments, composites can be prepared from a liquid. The liquid may be, for example, a slurry, a solution, an emulsion, or the like. The liquid may contain discontinuous fibers such as discussed herein, and may be applied to a substrate. The fibers may then be aligned as discussed herein, and the liquid may be then be removed, e.g., to create a fiber-containing substrate. After alignment, the final composite may be formed, for example, by applying heat (for example, to remove the liquid), and/or pressure (for example, to embed the fibers into the substrate), e.g., to remove the liquid and/or to cure the thermoset material. In some cases, the composite can be set or hardened, e.g., with a binder, which may be used to immobilize or fix the discontinuous agents within the substrate or composite, or within a polymeric material. In addition, in some cases, the composite may be removed from the substrate, e.g., as discussed herein. The composite may be relatively stiff or flexible in various embodiments. For instance, in one set of embodiments, the composite may be wound into a continuous roll. In some cases, a liquid, such as a slurry, may be used. The slurry may include the discontinuous fibers and optionally, magnetic particles or other components, e.g., to be applied to the substrate.

In one set of embodiments, the liquid is able to neutralize the electrostatic interactions between the discontinuous fibers, for example using aqueous liquids. This may be useful, for example, to allow the discontinuous fibers to be dispersed within the liquid at relatively high fiber volumes without agglomeration. In some cases, surfactants and/or alcohols can be introduced into the slurry to reduce electrostatic interactions between the fibers. High shear mixing and flow also may help reduce agglomeration/flocculation in certain cases.

In some embodiments, the liquid phase may include, for example, a thermoplastic or a thermoset, e.g., a thermoplastic solution, thermoplastic melt, thermoset, volatile organic compound, water, or oil. Non-limiting examples of thermosets include polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, polyvinylidene fluoride, phenolics, epoxies, bismaleimides, cyanate esters, polyimides, etc. Non-limiting examples of elastomers include silicone rubber and styrene butadiene rubber, etc. Non-limiting examples of thermoplastics include epoxy, polyester, vinyl ester, polycarbonates, polyamides (e.g., nylon, PA-6, PA-12, etc.), polyphenylene sulfide, polyetherimide, polyetheretherketone, polyetherketoneketone, etc. Non-limiting examples of ceramic monomers include a siloxane, a silazane, or a carbosilane, etc. In some cases, for example, one or more of these may be added to assist in homogenously dispersing the discontinuous fibers within the liquid. Examples of volatile organic compounds include, but are not limited to, isopropanol, butanol, ethanol, acetone, toluene, or xylenes.

Any suitable amount of discontinuous fiber may be present in the slurry or other liquid. For instance, at least 10%, at least 15%, at least 20%, at least 25%, at least 30%, at least 35%, at least 40%, at least 45%, at least 50%, at least 55%, at least 60%, at least 65%, at least 70%, at least 75%, or at least 80% of the volume of the slurry may be discontinuous fiber. In some cases, no more than 85%, no more than 80%, no more than 75%, no more than 70%, no more than 65%, no more than 60%, no more than 55%, no more than 50%, no more than 45%, no more than 40%, no more than 35%, no more than 30%, no more than 25%, no more than 20%, no more than 15%, or no more than 10% may be discontinuous fiber. Combinations of any of these are also possible in some cases. For example, a slurry or other liquid may contain between 70% and 80%, between 75% and 85%, between 50% and 90%, etc. discontinuous fiber.

For example, after preparation of the slurry or other liquid, it may be applied to or exposed to the substrate. Any suitable method may be used to apply the slurry or other liquid to the substrate. As non-limiting examples, the liquid may be poured, coated, sprayed, or painted onto the substrate, or the substrate may be immersed partially or completely within the liquid. The liquid may be used to wet, coat, and/or surround the substrate.

A magnetic field may be applied to manipulate the discontinuous fibers, directly or indirectly, as discussed herein, according to one set of embodiments. Any suitable magnetic field may be applied. In some cases, the magnetic field is a constant magnetic field. In other cases, the magnetic field may be time-varying; for example, the magnetic field may oscillate or periodically change in amplitude and/or direction, e.g., to facilitate manipulation of the discontinuous agents. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500 Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases.

The magnetic field, whether constant or oscillating, may have any suitable amplitude. For example, the amplitude may be at least 0.001 T, at least 0.003 T, at least 0.005 T, at least 0.01 T, at least 0.03 T, at least 0.05 T, at least 0.1 T, at least 0.3 T, at least 0.5 T, at least 1 T, at least 3 T, at least 5 T, at least 10 T, etc. The amplitude in some cases may be no more than 20 T, no more than 10 T, no more than 5 T, no more than 3 T, no more than 1 T, no more than 0.5 T, no more than 0.3 T, no more than 0.1 T, no more than 0.05 T, no more than 0.03 T, no more than 0.01 T, no more than 0.005 T, no more than 0.003 T, etc. The amplitude may also fall within any combination of these values. For instance, the amplitude may be between 0.01 T to 10 T, between 1 T and 3 T, between 0.5 T and 1 T, or the like. The amplitude may be substantially constant, or may vary in certain embodiments, e.g., within any range of these values.

In some embodiments, the magnetic field direction (i.e., direction of maximum amplitude) may vary by +/−90°, +/−85°, +/−80°, +/−75°, +/−70°, +/−65°, +/−60°, +/−55°, +/−50°, +/−45°, +/−40°, +/−35°, +/−30°, +/−25°, +/−20°, +/−15°, +/−10°, +/−5° about a mean direction.

A variety of different devices for producing suitable magnetic fields may be obtained commercially, and include permanent magnets or electromagnets. In some cases, an oscillating magnetic may be created by attaching a magnet to a rotating disc and rotating the disc at an appropriate speed or frequency. Non-limiting examples of permanent magnets include iron magnets, alnico magnets, rare earth magnets, or the like.

In one set of embodiments, shear flow may be used to align or manipulate the discontinuous fibers. For example, a shearing fluid may be applied to the substrate to cause at least some of the plurality of discontinuous agents to align, e.g., in the direction of shear flow. Examples of shearing fluids that may be used include water, or another liquid, such as oil, an alcohol such as ethanol, an organic solvent (e.g., such as isopropanol, butanol, ethanol, acetone, toluene, or xylenes), or the like. In certain embodiments, the shearing fluid may have a viscosity of at least 1 cP. In addition, in some cases, the shearing fluid may be a gas, such as air. The linear flow rate of the shearing fluid, may be, for example, at least 10 mm/min, at least 20 mm/min, at least 30 mm/min, at least 50 mm/min, at least 100 mm/min, at least 200 mm/min, at least 300 mm/min, etc.

For example, in one set of embodiments, the fibers can be added to a liquid, including alcohol, solvent, or resin, to form a slurry. The slurry can be flowed to align the fibers in some cases, e.g., wherein the slurry is used as a shearing fluid. In other cases, however, the slurry may first be applied to a substrate, then a shearing fluid used to align the fibers. In addition, in some embodiments, mechanical vibration may be used to manipulate the discontinuous fibers, e.g., in addition to and/or instead of magnetic manipulation and/or shear flow. For example, mechanical vibration can be used to move discontinuous fibers into or on the substrate, e.g., into pores or holes within the substrate, and/or at least to substantially align the discontinuous agents within the substrate, e.g., as discussed herein. In one set of embodiments, mechanical vibration may be applied to cause motion of the discontinuous fibers of at least 1 micrometer, at least 2 micrometers, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1,000 micrometers, at least 2,000 micrometers, at least 3,000 micrometers, at least 5,000 micrometers, or at least 10,000 micrometers.

In addition, in some cases, the mechanical vibrations may be time-varying; for example, the mechanical vibrations may periodically change in amplitude and/or direction, e.g., to facilitate manipulation of the discontinuous fibers. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500 Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases. If applied in conjunction with an oscillating magnetic field, their frequencies may independently be the same or different.

During and/or after alignment, the discontinuous fibers within the substrate may be set or fixed in some embodiments, e.g., to prevent or limit subsequent movement of the discontinuous fibers and form a relatively hard composite, in one set of embodiments. Non-limiting examples of techniques to form the composite include, but are not limited to solidifying, hardening, gelling, melting, heating, evaporating, freezing, lyophilizing, or pressing the liquid or the slurry. In another set of embodiments, a material, such as a thermosetting polymer, may be cured to harden the composite. The substrate may thus form a composite that is a solid, a gel, or the like.

In some cases, the liquid may comprise a relatively volatile solvent, which can be removed by heating and/or evaporation (e.g., by waiting a suitable amount of time, or allowing the solvent to evaporate, e.g., in a fume hood or other ventilated area). Non-limiting examples of volatile solvents include isopropanol, butanol, ethanol, acetone, toluene, or xylenes. Other examples of methods of removing solvents include applying vacuum, lyophilization, mechanical shaking, or the like.

In one set of embodiments, heating may be applied to the substrate, for example, to dry the liquid or remove a portion of the solvent, e.g., to cause the polymeric precursor to cure and/or harden. For example, the substrate may be heated to a temperature of at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 90° C., at least about 100° C., at least about 125° C., at least about 150° C., at least about 175° C., at least about 200° C., at least about 250° C., at least about 300° C., at least about 350° C., at least about 400° C., at least about 450° C., at least about 500° C., etc. Any suitable method of applying heat may be used, for example, a thermoelectric transducer, an Ohmic heater, a Peltier device, a combustion heater, or the like. In some cases, the viscosity of the liquid may decrease as a result of heating. The heating may be applied, for example, prior, concurrent or subsequent to the application of magnetic field and/or mechanical vibration. In some cases, heating may be used to prevent or initiate cross-linking or curing of a thermosetting prepolymer.

In one set of embodiments, pressure may be applied to the substrate, e.g., to partially or completely embed the discontinuous fibers into the substrate, e.g., to form the composite, to remove liquid, and/or to harden and/or cure a polymeric precursor to form a polymeric material, such as a thermoset material. In some cases, the pressure may be used to also remove some of the liquid from the substrate. Examples include, but are not limited to, hot-pressing, calendaring, vacuum infusion, or the like. The pressure, may be, for example, at least 15 psi (gauge), at least 30 psi, at least 45 psi, etc. (1 psi=6895 Pa)

In addition, in one set of embodiments, a polymer precursor, such as a precursor of a thermoset polymer (e.g., an epoxy), is applied to or coated onto at least a portion of the substrate. For example, at least 50%, at least 60%, at least 70%, at least 80%, at least 90%, or substantially all of a surface of the substrate may be coated with a precursor. In some cases, the precursor embeds at least some of the discontinuous fibers on the substrate, e.g., that are substantially aligned as discussed herein. For instance, sufficient precursor may be added to substantially embed at least 10%, at least 20%, at least 30%, at least 40%, at least 50%, at least 60%, at least 70%, at least 80%, at least 90%, or substantially all of the discontinuous fibers.

The precursor may be any precursor as is described herein. For example, in one set of embodiments, the precursor is the precursor of an epoxy. The substrate may be coated or otherwise exposed to the precursor using any suitable technique. For example, the precursor may be poured, coated, sprayed, or painted onto the substrate, or the substrate may be immersed partially or completely within the precursor. The precursor may be used to wet, coat, and/or surround the substrate. Other examples include, but are not limited to, hot-pressing, calendaring, or vacuum infusion.

As discussed herein the precursor may be cured and/or hardened, e.g., to form a polymer, by applying one or more suitable conditions, such as heat, pressure, catalysts, etc. Those of ordinary skill in the art will know of suitable conditions to cause a precursor, such as a thermoset polymer, to cure and/or harden to form a polymer. Heating and/or pressures may include any of those conditions described herein. For example, in some cases, the precursor may harden spontaneously, e.g., upon evaporation of a solvent. In certain embodiments, heat may be applied to harden the precursor, e.g., by exposing the composite to temperatures such as those described above. In some embodiments, the precursor may be hardened upon exposure to light or a catalyst, e.g., to facilitate or promote a chemical or polymerization reaction to cause the binder to polymerize. For example, a thermosetting polymer may be cured upon exposure to suitable temperatures. In another example, a polymer may be exposed to ultraviolet light to cause polymerization to occur.

In some embodiments, the precursor may form a polymer comprising at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

In some cases, after the precursor has hardened or cured to form a polymeric material, the polymeric material may optionally be removed from the substrate. The polymeric material may also comprise at least some of the discontinuous fibers from the substrate, e.g., if the precursor was infused within or otherwise embedded or surrounded at least some of the discontinuous fibers on the substrate. For example, the polymeric material may embed discontinuous fibers that are substantially aligned.

A variety of different techniques may be used to remove at least some of the polymer from the substrate, e.g., as a polymer material. For instance, in one embodiment, some or all of the thermoset polymer may be peeled off of the substrate, e.g., as a single polymeric layer. The polymeric material may be removed manually or automatically, for example, by using a roll-to-roll where the material is peeled off of the substrate onto a roll.

A binder may also be applied in one set of embodiments, e.g., before, during, and/or after hardening of the composite and/or removal of at least a portion of the liquid. In some embodiments, the binder may be used to produce a pre-impregnated composite ply material, e.g., by wetting dry ply material. The binder may be a liquid in some cases, and may be caused to harden after application to the composite. In some cases, the binder is permeated into at least a portion of the composite. Non-limiting examples of permeation techniques include using gravitational and capillary forces, by applying pressure to the binder to force it into the composite, or the like. Other examples include, but are not limited to, hot-pressing, calendaring, or vacuum infusion. However, in some cases, the binder is used to coat all, or only a portion of, the substrate, e.g., without necessarily requiring permeation.

In some cases, the binder may comprise a resin. The binder may include a thermoset or a thermoplastic. In certain embodiments, the binder may comprise a thermoplastic solution, a thermoplastic melt, thermoplastic pellets, thermoplastic powders, thermoplastic films, a thermoset resin, a volatile compound such as a volatile organic compound, water, or an oil. Additional non-limiting examples of binders include an epoxy, polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, polytetrafluoroethylene, perfluoroalkoxy alkanes, styrene butadiene rubber, or a pre-ceramic monomer, such as a siloxane, a silazane, or a carbosilane. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

After permeation, the binder may be hardened. In some cases, the binder may harden spontaneously, e.g., upon evaporation of a solvent. In certain embodiments, heat may be applied to harden the binder, e.g., by exposing the composite to temperatures such as those described above. In some embodiments, the binder may be hardened upon exposure to light or a catalyst, e.g., to facilitate or promote a chemical or polymerization reaction to cause the binder to polymerize. For example, a thermosetting polymer may be cured upon exposure to suitable temperatures. In another example, a polymer may be exposed to ultraviolet light to cause polymerization to occur.

The composite, in some cases, may contain additional layers or materials, e.g., in addition to these. For example, the substrate may be one of a number of layers within the composite. Other layers within the composite may include polymers, composite materials, metal, ceramics, or the like. For example, the composite may be consolidated with another composite layer to form a composite structure.

Composites such as those discussed herein may be used in a wide variety of applications, in various aspects. Composites such as those described herein may exhibit a variety of different features in various embodiments. For example, composites such as those discussed herein may be useful for reducing or eliminating stress concentrations, reducing or eliminating delamination, increasing planar strength and/or stiffness, reducing or eliminating surface wear, dissipating electricity (e.g., in electrical shocks), transmitting electrical signals, attenuating electromagnetic waves, transmitting electromagnetic waves, dissipating heat (e.g., in thermal shocks), reducing or eliminating thermal gradients, storing energy, synthesizing ex-PAN carbon fibers, synthesizing ceramic matrix composites (CMC), or the like.

For example, in one set of embodiments, a composite ply with at least three-axes of fiber orientation may be produced. This fiber structure may allow the composite ply to distribute stresses between subsequent plies and adjacent components, which may reduce or eliminate stress concentrations. This may significantly improve the strength of a laminated composite structure under dynamic loads, e.g., when a laminated composite structure is formed with small features or mates with a material with drastically different stiffness (e.g. metal alloys or plastics).

Another set of embodiments is generally directed to a composite ply with through-plane reinforcement of the interlaminar region. This fiber reinforcement allows the composite ply to efficiently distribute stresses between adjacent layers to hinder the formation of cracks and prevents a crack from propagating in the interlaminar region. The targeted reinforcement of the interlaminar region can significantly improve the strength of a laminated composite structure under shock and cyclic loads. This formulation may be useful when a laminated composite structure is formed with long sheets of composite ply, for example, where a single crack in the interlaminar region between the plies can potentially compromise the structural integrity of the overall structure.

Yet another set of embodiments is generally directed to a composite ply with through-plane reinforcement, e.g., a through-plane uni-directional fabric. This fiber reinforcement may reinforce target through-plane loads (e.g. point loads and high-pressure loads). The targeted through-plane reinforcement can significantly improve the strength and stiffness of a laminated composite structure under expected through-plane mechanical loads. This may be useful for effectively handling a composite ply with through-plane reinforcement that can easily deform during handling in an un-cured state while forming an exterior shell for a laminated composite structure.

Still another set of embodiments is generally directed to a composite ply with through-plane oriented carbon fibers. In some cases, the through-plane reinforcement can significantly improve the polymer matrix's resistance to damage from mechanical wear (e.g. abrasion) and/or chemical corrosion (e.g. oxidization). This formulation may be useful, for example, for forming surfaces that protect structures from mechanical and chemical wear.

In one set of embodiments, a composite ply is provided having enhanced through-plane electrical conductivity. This can significantly improve the resistance to damage caused by localized heat generation induced by charge accumulation upon rapid discharge of electrical energy (e.g. lightning). This formulation is particularly useful for forming surfaces that protect structures from damage from electrical discharge. In another set of embodiments, a composite ply with enhanced near-isotropic electrical conductivity is provided. This may effectively conduct electrical signals. In yet another set of embodiments, a composite ply is provided with enhanced isotropic electrical conductivity. This material may effectively attenuate incident electromagnetic waves. In still another set of embodiments, a composite ply is provide having low radio-frequency interference and enhanced through-plane thermal conductivity to effectively transmit electromagnetic waves without overheating.

Another set of embodiments is generally directed to a composite ply with enhanced through-plane thermal conductivity for sufficient structural integrity under heating. This may be useful in some embodiments for increasing structural integrity under rapid temperature fluctuations. Still another set of embodiments is generally directed to a composite ply with through-plane thermal conductivity and low electrical conductivity. This formulation may be useful for effectively moving and distributing heat flux, e.g., in electronics.

Yet another set of embodiments is generally directed to a carbon-based composite ply with through-plane electrical conductivity. This may be useful for adsorbing ionic species from an electrolyte and efficiently distributing electrical charge.

One set of embodiments is generally directed to a composite ply with through-plane carbon fiber catalysts. At appropriate temperatures, a PAN (polyacrylonitrile) matrix may be oxidized and carbonized to form a carbon matrix. Another set of embodiments is generally directed to a composite ply with through-plane carbon fiber or silicon carbide catalysts. At appropriate temperatures, the polymer matrix may be oxidized to form a ceramic matrix.

The following documents are incorporated herein by reference: Int. Pat. Apl. Ser. No. PCT/US2018/021975, filed Mar. 12, 2018, entitled "Fiber-reinforced composites, methods therefor and articles comprising the same," published as Int. Pat. Apl. Pub. No. WO 2018/175134; U.S. Pat. Apl. Ser. No. 62/777,438, filed Dec. 10, 2018, entitled "Systems and Methods for Carbon Fiber Alignment and Fiber-Reinforced Composites"; Int. Pat. Apl. Ser. No.: PCT/US2019/065142, filed Dec. 9, 2019, entitled "Systems and Methods for Carbon Fiber Alignment and Fiber-Reinforced Composites"; U.S. Provisional Pat. Apl. Ser. No. 62/872,686, filed Jul. 10, 2019, entitled "Systems and Methods for Short-Fiber Films and Other Composites"; and U.S. Provisional Pat. Apl. Ser. No. 62/938,265, filed Nov. 20, 2019, entitled "Methods and Systems for Forming Composites Comprising Thermosets." In addition, a U.S. patent application, filed on even date herewith, entitled "Compositions and Methods for Carbon Fiber-Metal and Other Composites," is also incorporated herein by reference in its entirety.

The following examples are intended to illustrate certain embodiments of the present disclosure, but do not exemplify the full scope of the disclosure.

Example 1

This example illustrates a slurry, comprising milled carbon fibers (high modulus, 95% carbon content, 150 micrometers long) dispersed in water to form an aqueous slurry. This slurry was casted onto a PEI substrate (76 micrometers thick), and a vertical magnetic field (0.2 T field strength, orthogonal to the PEI substrate) was applied. The vertical magnetic field oriented the milled carbon fibers as they sedimented. After the fibers were sedimented and aligned orthogonally to the PEI substrate, the water was evaporated. Once the water was removed, the PEI substrate with the vertically oriented milled fibers was compacted at 1 MPa and heated to 330° C. At this temperature and pressure, the PEI melts and the milled fibers were embedded into the PEI melt. This material was then cooled to ambient temperature and the pressure released. At the end of this process, the milled fibers retained their orientation and are embedded into the PEI substrate, as can be seen in FIG. 1.

Example 2

Figure 2:
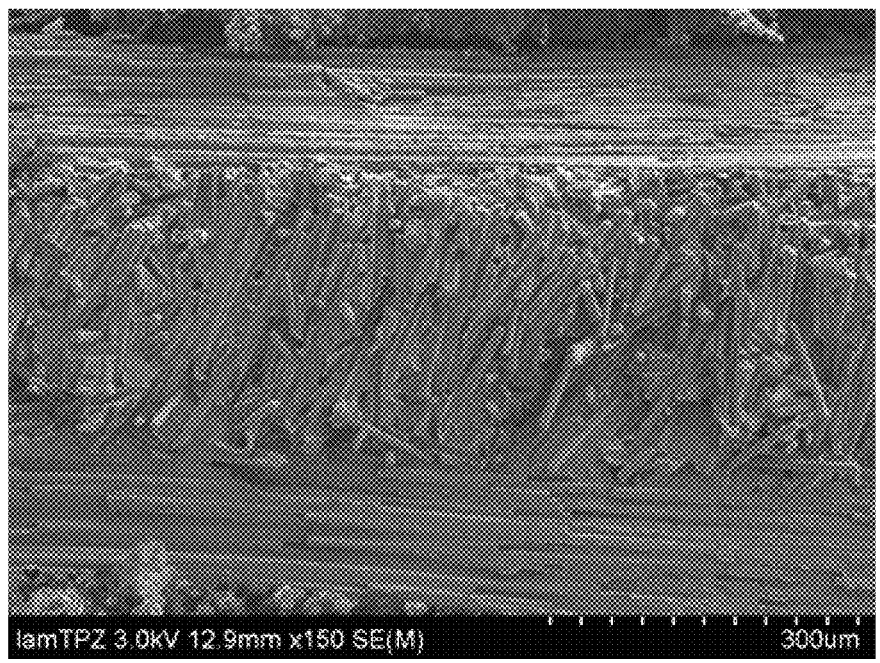
FIG. 2 illustrates a composite with aligned carbon fibers, in another embodiment of the disclosure.

The short fiber composite layer produced in Example 1 was layered between two commercially available carbon fiber laminates made with continuous carbon fiber and PEI in this example. The layered material was compacted at 0.5 MPa and heated to 280° C. The PEI softened and allowed the vertically oriented milled fibers of the short fiber film to percolate with the continuous fibers of the commercially available carbon fiber laminates. This material was then cooled to ambient temperature and the pressure is released, as can be seen in FIG. 2.

Example 3

This example illustrates a process for making a thermoset ZRT (z-axis reinforced tape), in accordance with one embodiment.

In a first step, a substrate is coated with a slurry. The substrate in this example is an Ultem film, although other substrates may be used. The slurry contained a milled fiber dispersed in water with trace polymer additives.

The milled fibers were next aligned by passing the coated substrate through a vertical magnetic field of 0.3 T.

Figure 3:
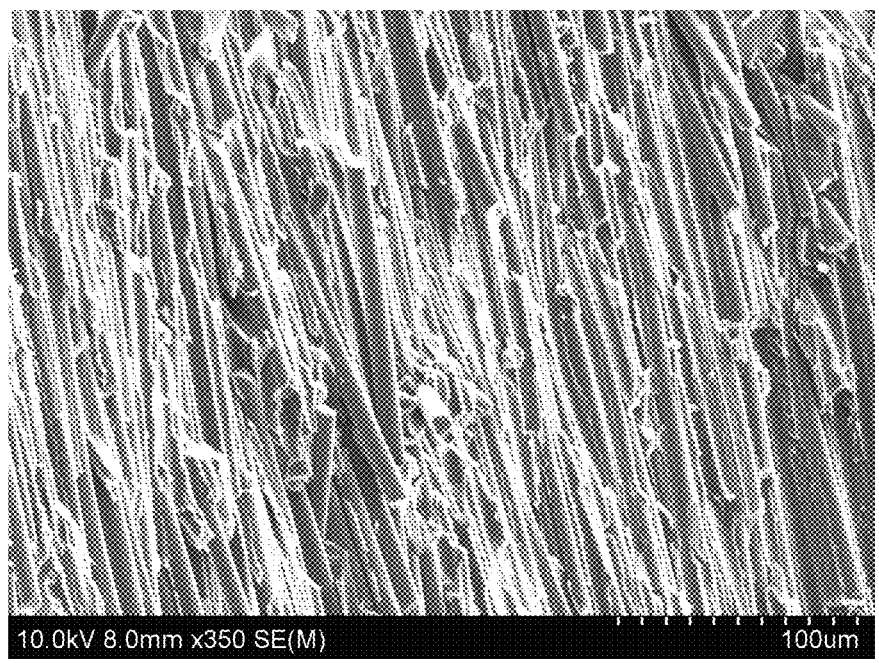
FIG. 3 illustrates an SEM of a composite in accordance with one embodiment.

Next, water was removed from the slurry via evaporation, although some of the water was drained from the sides of the substrate. The substrate was heated to 180° C. to ensure removal of moisture. In addition, the high heat also "tacks up" a trace polymer binder that holds the Z-axis milled fibers in place Next, transfer to an epoxy film was achieved by pressing a hot melt epoxy film onto the dried milled fiber coated substrate. The hot melt epoxy film was heated to 60° C. to flow the epoxy. After the epoxy flowed onto the substrate, the film was cooled and peeled from the substrate to produce a ZRT with a thermoset matrix. An SEM of the film is provided in FIG. 3.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   a composite comprising a substrate and a plurality of discontinuous fibers contained within at least a portion of the substrate, wherein the plurality of discontinuous fibers is substantially aligned at a fiber volume fraction of at least 30 vol % within the entire composite, wherein the discontinuous fibers comprise carbon fibers having a carbon content greater than 94% and a modulus of at least 200 GPa, and wherein the plurality of discontinuous fibers is substantially aligned orthogonally to the substrate.

2. The article of claim 1, wherein the fiber volume fraction is at least 40 vol %.

3. The article of claim 1, wherein the substrate comprises a thermoplastic.

4. The article of claim 1, wherein the substrate comprises one or more of polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

5. The article of claim 1, wherein the discontinuous fibers further comprise natural fibers.

6. The article of claim 1, wherein the discontinuous fibers are coated with a coating.

7. The article of claim 6, wherein the discontinuous fibers are coated with sizing.

8. The article of claim 1, wherein the discontinuous fibers have an anisotropic diamagnetic response in response to a magnetic field.

9. The article of claim 1, wherein the discontinuous fibers exhibit a physical response to a magnetic field strength of 10 T.

10. The article of claim 1, wherein at least 50% of the plurality of discontinuous fibers are aligned.

11. The article of claim 1, wherein at least some of the plurality of discontinuous fibers have a plurality of magnetic particles adsorbed thereto.

12. The article of claim 1, wherein the plurality of discontinuous fibers are free of magnetic particles.

13. The article of claim 1, wherein the composite is substantially free of paramagnetic or ferromagnetic materials.

14. The article of claim 1, wherein the composite is wound into a roll.

15. The article of claim 1, wherein the substrate is one of a plurality of layers within the composite.

16. The article of claim 1, wherein the composite further comprises a binder binding the substrate and the plurality of discontinuous fibers.

17. The article of claim 1, wherein the fiber volume fraction is at least 50 vol%.

18. The article of claim 1, wherein the fiber volume fraction is at least 70 vol%.

19. The article of claim 1, wherein the composite has a maximum cross-sectional thickness of less than 1 cm.

20. The article of claim 1, wherein the plurality of discontinuous fibers is substantially aligned in parallel.

21. An article, comprising:
a composite comprising a substrate and a plurality of discontinuous fibers contained within at least a portion of the substrate, wherein the plurality of discontinuous fibers is substantially aligned at a fiber volume fraction of at least 30 vol % within the entire composite, wherein the discontinuous fibers have an anisotropic diamagnetic response in response to a magnetic field, and wherein the discontinuous fibers comprise carbon fibers having a carbon content greater than 94% and a modulus of at least 200 GPa.

22. The article of claim 21, wherein the fiber volume fraction is at least 40 vol %.

23. The article of claim 21, wherein the substrate comprises a thermoplastic.

24. The article of claim 21, wherein the substrate comprises one or more of polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

25. The article of claim 21, wherein the discontinuous fibers further comprise natural fibers.

26. The article of claim 21, wherein the discontinuous fibers are coated with a coating.

27. The article of claim 26, wherein the discontinuous fibers are coated with sizing.

28. The article of claim 21, wherein the discontinuous fibers exhibit a physical response to a magnetic field strength of 10 T.

29. The article of claim 21, wherein at least 50% of the plurality of discontinuous fibers are aligned.

30. The article of claim 21, wherein at least some of the plurality of discontinuous fibers have a plurality of magnetic particles adsorbed thereto.

31. The article of claim 21, wherein the plurality of discontinuous fibers are free of magnetic particles.

32. The article of claim 21, wherein the composite is substantially free of paramagnetic or ferromagnetic materials.

33. The article of claim 21, wherein the composite is wound into a roll.

34. The article of claim 21, wherein the substrate is one of a plurality of layers within the composite.

35. The article of claim 21, wherein the composite further comprises a binder binding the substrate and the plurality of discontinuous fibers.

36. The article of claim 21, wherein the fiber volume fraction is at least 50 vol%.

37. The article of claim 21, wherein the fiber volume fraction is at least 70 vol%.

38. The article of claim 21, wherein the composite has a maximum cross-sectional thickness of less than 1 cm.

39. The article of claim 21, wherein the plurality of discontinuous fibers is substantially aligned orthogonally to the substrate.

40. The article of claim 21, wherein the plurality of discontinuous fibers is substantially aligned in parallel.

41. An article, comprising:
a composite comprising a substrate and a plurality of discontinuous fibers contained within at least a portion of the substrate, wherein the plurality of discontinuous fibers is substantially aligned at a fiber volume fraction of at least 30 vol % within the entire composite and have an anisotropic diamagnetic response in response to a magnetic field, wherein the composite further comprises a binder binding the substrate and the plurality of discontinuous fibers, wherein the discontinuous fibers comprise carbon fibers having a carbon content greater than 94% and a modulus of at least 200 GPa.

42. The article of claim 41, wherein the fiber volume fraction is at least 40 vol %.

43. The article of claim 41, wherein the substrate comprises a thermoplastic.

44. The article of claim 41, wherein the substrate comprises one or more of polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

45. The article of claim 41, wherein the discontinuous fibers further comprise natural fibers.

46. The article of claim 41, wherein the discontinuous fibers are coated with a coating.

47. The article of claim 46, wherein the discontinuous fibers are coated with sizing.

48. The article of claim 41, wherein the discontinuous fibers exhibit a physical response to a magnetic field strength of 10 T.

49. The article of claim 41, wherein at least 50% of the plurality of discontinuous fibers are aligned.

50. The article of claim 41, wherein at least some of the plurality of discontinuous fibers have a plurality of magnetic particles adsorbed thereto.

51. The article of claim 41, wherein the plurality of discontinuous fibers are free of magnetic particles.

52. The article of claim 41, wherein the composite is substantially free of paramagnetic or ferromagnetic materials.

53. The article of claim 41, wherein the composite is wound into a roll.

54. The article of claim 41, wherein the substrate is one of a plurality of layers within the composite.

55. The article of claim 41, wherein the fiber volume fraction is at least 50 vol%.

56. The article of claim 41, wherein the fiber volume fraction is at least 70 vol%.

57. The article of claim 41, wherein the composite has a maximum cross-sectional thickness of less than 1 cm.

58. The article of claim 41, wherein the plurality of discontinuous fibers is substantially aligned orthogonally to the substrate.

59. The article of claim 41, wherein the plurality of discontinuous fibers is substantially aligned in parallel.

60. An article, comprising:
a composite comprising a substrate and a plurality of discontinuous fibers contained within at least a portion of the substrate, wherein the plurality of discontinuous fibers is substantially aligned at a fiber volume fraction of at least 30 vol% within the entire composite, wherein the discontinuous fibers comprise carbon fibers having a carbon content greater than 94% and a modulus of at least 200 GPa, and wherein the discontinuous fibers exhibit a physical response to a magnetic field strength of 10 T.

61. The article of claim 60, wherein the fiber volume fraction is at least 40 vol%.

62. The article of claim 60, wherein the substrate comprises a thermoplastic.

63. The article of claim 60, wherein the substrate comprises one or more of polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

64. The article of claim 60, wherein the discontinuous fibers are coated with a coating.

65. The article of claim 60, wherein the discontinuous fibers have an anisotropic diamagnetic response in response to a magnetic field.

66. The article of claim 60, wherein at least 50% of the plurality of discontinuous fibers are aligned.

67. The article of claim 60, wherein the composite is substantially free of paramagnetic or ferromagnetic materials.

68. The article of claim 60, wherein the substrate is one of a plurality of layers within the composite.

69. The article of claim 60, wherein the composite further comprises a binder binding the substrate and the plurality of discontinuous fibers.

70. The article of claim 60, wherein the fiber volume fraction is at least 50 vol%.

71. The article of claim 60, wherein the plurality of discontinuous fibers is substantially aligned orthogonally to the substrate.

72. The article of claim 60, wherein the plurality of discontinuous fibers is substantially aligned in parallel.

73. An article, comprising:
a composite comprising a substrate and a plurality of discontinuous fibers contained within at least a portion of the substrate, wherein the plurality of discontinuous fibers is substantially aligned at a fiber volume fraction of at least 30 vol% within the entire composite, wherein the discontinuous fibers comprise carbon fibers having a carbon content greater than 94% and a modulus of at least 200 GPa, and wherein at least some of the plurality of discontinuous fibers have a plurality of magnetic particles adsorbed thereto.

74. The article of claim 73, wherein the fiber volume fraction is at least 40 vol%.

75. The article of claim 73, wherein the substrate comprises a thermoplastic.

76. The article of claim 73, wherein the substrate comprises one or more of polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

77. The article of claim 73, wherein the discontinuous fibers are coated with a coating.

78. The article of claim 73, wherein the discontinuous fibers have an anisotropic diamagnetic response in response to a magnetic field.

79. The article of claim 73, wherein at least 50% of the plurality of discontinuous fibers are aligned.

80. The article of claim 73, wherein the composite is substantially free of paramagnetic or ferromagnetic materials.

81. The article of claim 73, wherein the substrate is one of a plurality of layers within the composite.

82. The article of claim 73, wherein the composite further comprises a binder binding the substrate and the plurality of discontinuous fibers.

83. The article of claim 73, wherein the fiber volume fraction is at least 50 vol%.

84. The article of claim 73, wherein the plurality of discontinuous fibers is substantially aligned orthogonally to the substrate.

85. The article of claim 73, wherein the plurality of discontinuous fibers is substantially aligned in parallel.

* * * * *